United States Patent [19]

Ohira et al.

[11] Patent Number: 5,701,158
[45] Date of Patent: Dec. 23, 1997

[54] DIGITAL IMAGE DECODING APPARATUS

[75] Inventors: Hideo Ohira; Tokumichi Murakami; Kohtaro Asai; Toshiaki Shimada, all of Tokyo, Japan

[73] Assignee: Mitsubishi Denki Kabushiki Kaisha, Tokyo, Japan

[21] Appl. No.: 710,431

[22] Filed: Sep. 17, 1996

[30] Foreign Application Priority Data

Mar. 4, 1996 [JP] Japan .................................. 8-046346

[51] Int. Cl.⁶ ........................................... H04N 7/50
[52] U.S. Cl. ........................... 348/410; 348/404; 348/405; 348/415; 348/420; 348/421
[58] Field of Search ..................... 348/421, 420, 348/404, 405, 412, 415; H04N 7/50

[56] References Cited

U.S. PATENT DOCUMENTS 5,543,843  8/1996  Kato .......................... 348/421

OTHER PUBLICATIONS

SGS–Thomson Microelectronics STI3500 Mpeg–2/CCIR 601 Video Decoder, Apr. 1994.

*Primary Examiner*—Howard W. Britton
*Attorney, Agent, or Firm*—Wolf, Greenfield & Sacks, P.C.

[57] ABSTRACT

Data decoded by a decoding section (101) are compressed by a compressing section (102) and then stored in a forecast/display frame memory section (103). The data in the forecast/display frame memory section (103) which are required to decode the other frames in the decoding section (101) are expanded and supplied to the decoding section through an expanding A section (104). The decoding section (101) uses the data restored by the expanding operation to decode the image data subjected to the forecast encoding operation. On the other hand, the display frame is subjected to the expanding operation at an expanding B section (105) after it has been read out from the forecast/display frame memory section (103), the expanded display frame then being output and supplied to a display device. Thus, the data stored in the forecast/display frame memory section (103) can be compressed to reduce the size of memory capacity.

13 Claims, 15 Drawing Sheets

HARR CONVERSION

$$A = \begin{bmatrix} 1 & 1 & 1 & 1 & 1 & 1 & 1 & 1 \\ 1 & 1 & 1 & 1 & -1 & -1 & -1 & -1 \\ 2 & 2 & -2 & -2 & 0 & 0 & 0 & 0 \\ 0 & 0 & 0 & 0 & 2 & 2 & -2 & -2 \\ 2 & -2 & 0 & 2 & 0 & 0 & 0 & 0 \\ 0 & 0 & 2 & -2 & 0 & 0 & 0 & 0 \\ 0 & 0 & 0 & 0 & 2 & -2 & 0 & 0 \\ 0 & 0 & 0 & 0 & 0 & 0 & 2 & -2 \end{bmatrix}$$

DIGITAL IMAGE DECODING APPARATUS

BACKGROUND OF THE INVENTION

1. Field of the Invention

The present invention relates to a digital image decoding apparatus and particularly to such an apparatus which is suitable for use in digital CATV, digital broadcasting systems, and so on.

2. Description of the Prior Art

FIGS. 16 and 17 show the block diagram and external memory map of an image processing LSI (e.g., STi3500) which are described in the manual issued by SGS-Thomson Microelectronics.

In FIG. 16, reference numeral 501 denotes a micon interface; 502 an FIFO memory; 503 a start code detecting section; 504 a memory I/O unit; 505 a variable-length decoding section; 506 a decode processing section; 507 a display processing section; 508 an external memory; 550 a micon interface line; 551 a micon bus; 552 data lines; 553 data lines; 554 an external memory bus; and 555 an input/output line.

In FIG. 17, reference numeral 601 denotes a bit buffer area; 602 an OSD (on-screen display) area; 603 a forecast frame memory 1 area; 604 a forecast frame memory 2 area; and 605 a display frame memory area.

The operation thereof will now be described. Encoded data accumulated in the bit buffer area 601 of the external memory 508 is fed to the start code detecting section 504 through the external memory bus 554 wherein the start code of the encoded data is detected. After the start code has been detected, the encoded data portion following the start code is supplied to the variable-length decoding section 505 through the FIFO memory 502, wherein the encoded data portion is subjected to variable-length decoding. The variable-length decoded data is then processed and subjected to image decoding by the decode processing section 506. The decoded image is written into the external memory 508 through the memory I/O unit 504.

The external memory 508 has the forecast frame memory 1 area 603, the forecast frame memory 2 area 604 and the display frame memory area 605, in each of which the decoded images will be stored. Image data used to forecast the other frames is written into the forecast frame memory 1 area 603 or the forecast frame memory 2 area 604. Image data used only for the display is written into the display frame memory area 605.

The data written into the display frame memory area 605 is then read out from there in synchronism with signals such as the horizontal/vertical synchronizing signals in TV scenes and output to the display processing section 507 through the external memory bus 554.

Data, such as character data, to be displayed in the OSD (on-screen display) area 602 of the external memory 508 is accessed, if necessary, as in the display frame memory area 605 and then supplied to the display processing section 507 through the external memory bus 554. If the data in the OSD area 602 is valid, the display processing section 507 overlays that valid data on the data read out from the display frame memory area 605 and externally outputs the overlaid data.

In such a manner, there can be provided a displayed image on the display data that has been stored in the external memory 508.

In the aforementioned digital image decoding apparatus of the prior art, the external memory 508 must store all the data required by the decoding step. More particularly, if data is to be encoded spanning between adjacent frames, all the data of other frames used to encode one frame have to be stored in the external memory 508 for decoding the image data of that frame.

Therefore, the decoding step requires a huge data storage. This raises a problem in that the required capacity of the external memory 508 is increased, enlarging the hardware.

SUMMARY OF THE INVENTION

In order to overcome the problem mentioned above, an object of the present invention is to provide a digital image decoding apparatus which can realize the reduction of hardware by suppressing memory size as much as possible.

According to the present invention, the data is compressed by a compressing section after it has been decoded. Therefore, data hold by the forecast frame memory section are those compressed by the compressing section. Thus, the required capacity of the forecast frame memory section is reduced. This enables reduction of the addressing, reading, and writing data width in this memory, resulting in reduction of the overall system size. This can also facilitate the hardware of the digital decoding apparatus and further accomplish the high-speed operation thereof. Consequently, dynamic image data can be more effectively processed by the digital decoding apparatus of the present invention.

In one form of the present invention, the compressing section can perform the compression for a time shorter than that required by the decoding section. Therefore, the operation of the compressing section will not adversely affect the decoding operation for incoming dynamic images and the displaying operation for decoded image data.

In another form of the present invention, the display frame data only used for display is stored in a memory other than the forecast memory that is used to decode the other frames. Thus, the forecast and display frames can be more easily read out.

In a further form of the present invention, at least one set of forecast frame data to be written into the forecast frame memory and the display frame data to be written into the display frame memory is compressed by the compressing section, depending on the type of image frame. Thus, the required capacity of the display frame is less then when the compression is performed for the display frame. On the other hand, the transmission to any other frame of degraded compressed image data in a forecast frame can be prevented when compression is not performed for that forecast frame. This is particularly effective for cases when compression is made through an irreversible encoding system.

In a further form of the present invention, the compressing section compresses both the forecast and display frames. Compression for decoded image data can therefore be efficiently carried out, resulting in reduction of both the forecast and display frame memory capacities. This is particularly preferable for compression through an irreversible encoding system since the compressed data can be perfectly restored through expansion.

In a further form of the present invention, all the data can be held in the forecast frame memory without being compressed if they are to be unidirectionally forecasted. On the other hand, all the data can be held in the forecast frame memory while being compressed if they are to be bidirectionally forecasted. Therefore, the train of encoded data through the unidirection forecast can be decoded without degradation of the image quality.

There is also a case where it is preferred that depending on the type of image frame, the data to be written into the forecast frame memory is compressed while the other data to be written into the display frame memory is not compressed. This can also reduce the capacity of the frame memory in which the decoded data is stored.

In a further form of the present invention, the compressing section can use Harr conversion to divide a converted coefficient into an important coefficient and a less important coefficient. An increased number of bits can be assigned to an important coefficient, resulting in more efficient compression.

In a further form of the present invention, the amount of information bits S generated for each block to be compressed can be fixed. Therefore, a location of the frame memory in which each block is to be stored can easily be grasped. This simplifies an addressing structure and facilitates removal of any block data.

In a further form of the present invention, an expanding section for the forecast frame reads data required by the decoding section from the forecast frame memory in which the data have been stored in block units. The read and compressed data is expanded and the data at a desired location is output. Thus, any data required by the decoding section can be taken out. This can provide a desired decoding operation in the decoding section.

In a further form of the present invention, the data expanded in block unit can be accumulated in a block memory such that a forecast image data required by the decoding operation can be efficiently retrieved from any location in the block memory.

In a further form of the present invention, the processing speed in the compressing and forecast frame expanding sections can be increased higher than that in the decoding section. Thus, dynamic images sequentially supplied to these sections can be processed in real time.

In a further form of the present invention, the display frame data compressed in block unit are read out and expanded while the expanded image data are sequentially outputted in the scan direction (in synchronism with the horizontal and vertical scans for image display). Thus, the data for image display can be obtained.

In a further form of the present invention, the display expanding section has a display memory for storing image data for one frame. Thus, the data read out from the display memory can be directly used as display signals.

As described, the digital image decoding apparatus of the present invention can not only reduce the capacity of a frame memory required when the decoded data is used to perform the decoding and displaying operations for any other frame, but also decrease the address and data width required when the reading and writing operations are made for the frame memory. This can greatly reduce the apparatus in size and cost.

DETAILED DESCRIPTION OF THE PREFERRED EMBODIMENT

The present invention will now be described by way of example with reference to the drawings.

Figure 1:
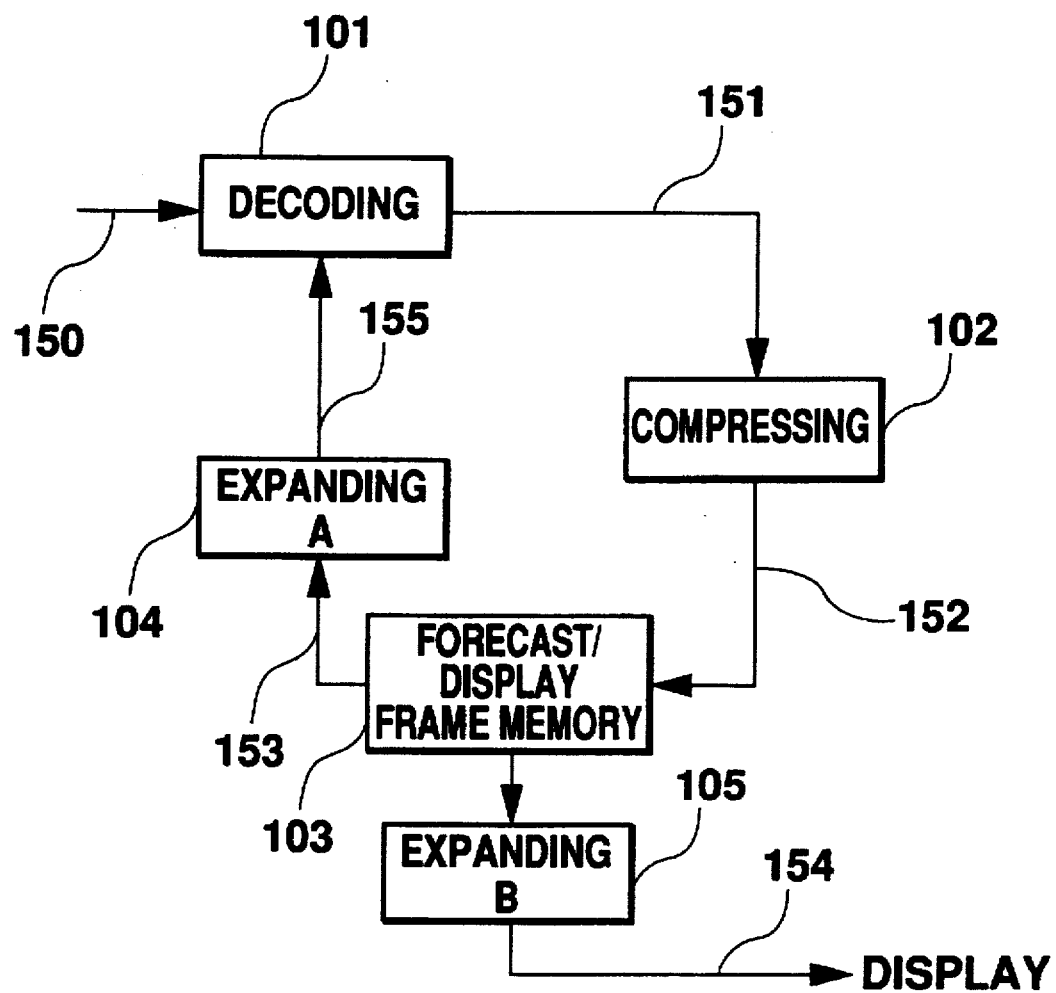
FIG. 1 is a block diagram of one embodiment of a digital image decoding apparatus constructed in accordance with the present invention.

FIG. 1 is a schematic block diagram of one embodiment of a digital image decoding apparatus according to the present invention. Referring to FIG. 1, reference numeral 101 designates a decoding section for decoding encoded image data; 102 a compressing section for compressing the decoded data; 103 a frame memory section comprising a forecast frame memory and a display frame memory; 104 an expanding A section for expanding the compressed data read out from the frame memory; and 105 an expanding B section for outputting the data in the order of raster.

Reference numeral 150 represents encoded data; 151 decoded data; 152 compressed data; 153 compressed data; 154 display data; and 155 expanded data.

The operation of the apparatus shown in FIG. 1 will be described below. The decoding section 101 decodes an incoming encoded data using the expanding data 151 as forecast data. The decoded data 151 is then reversibly or irreversibly compressed by the compressing section 102 to reduce the amount of information therein. The compressed data 152 is used as a forecast data for a frame to be decoded in future and also written into the forecast/display frame memory section 103 for displaying. The compressed data of a frame not used for forecasting is written into the display frame area while the compressed data of a frame used for forecasting is written into both the display and forecast frame areas. All the data are not necessarily compressed, as will be described.

The written compressed data is expanded by the expanding B section 105 for image display. The expanded data is read out and displayed in the order of raster.

On the other hand, the expanding A section 104 accesses the forecast/display frame memory section 103. The resulting compressed data is then expanded and supplied to the decoding section 101 as an expanded data 155 (forecast data) that is required by the decoding operation in the decoding section 101.

The forecast/display frame memory section 103 may be structured to have a capacity less than the amount of information that is possessed by an image data to be displayed, since the frame memory section 103 is adapted to store the compressed data.

Figure 2:
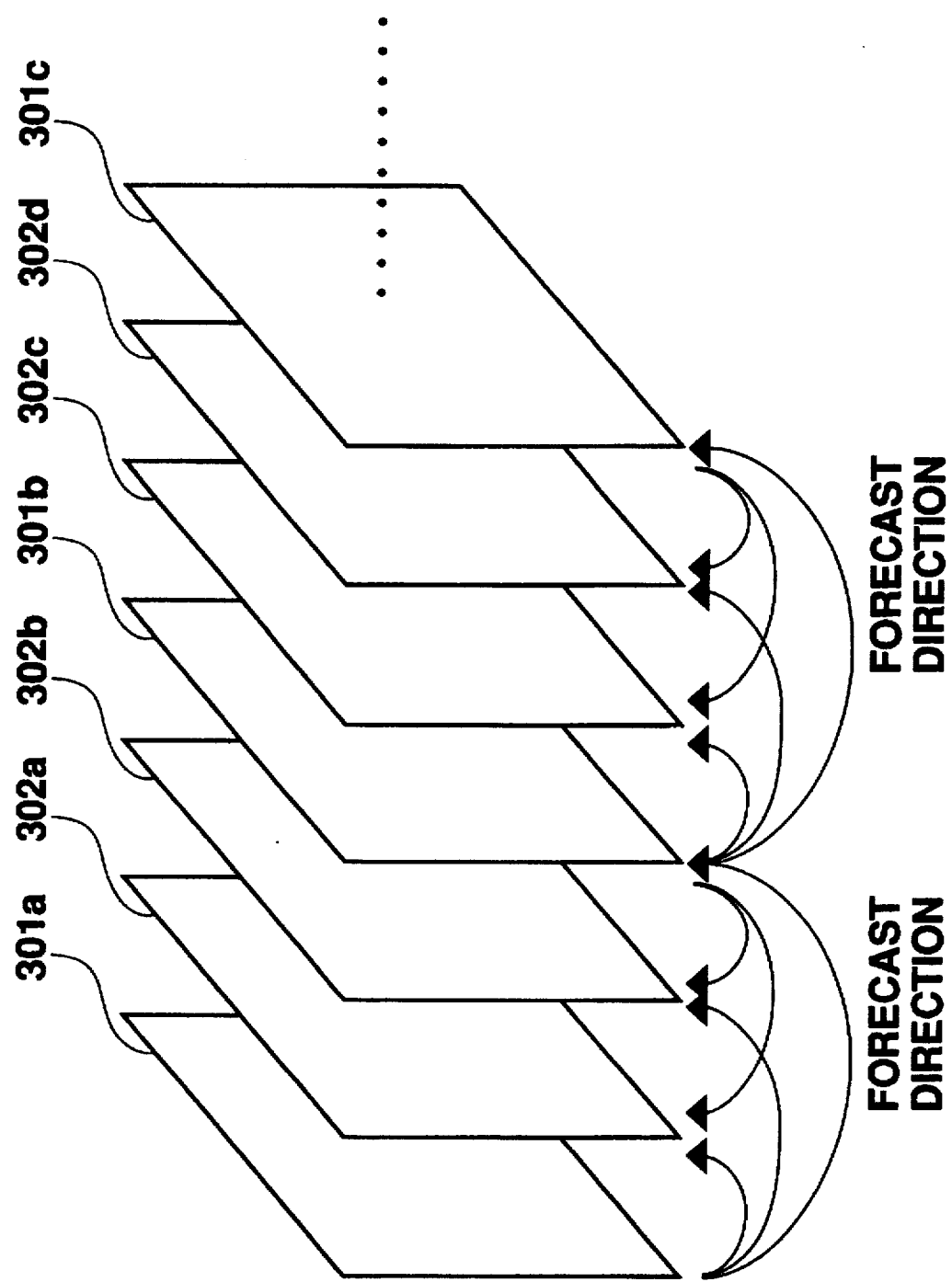
FIG. 2 is a view showing different types of frames.
Figure 3:
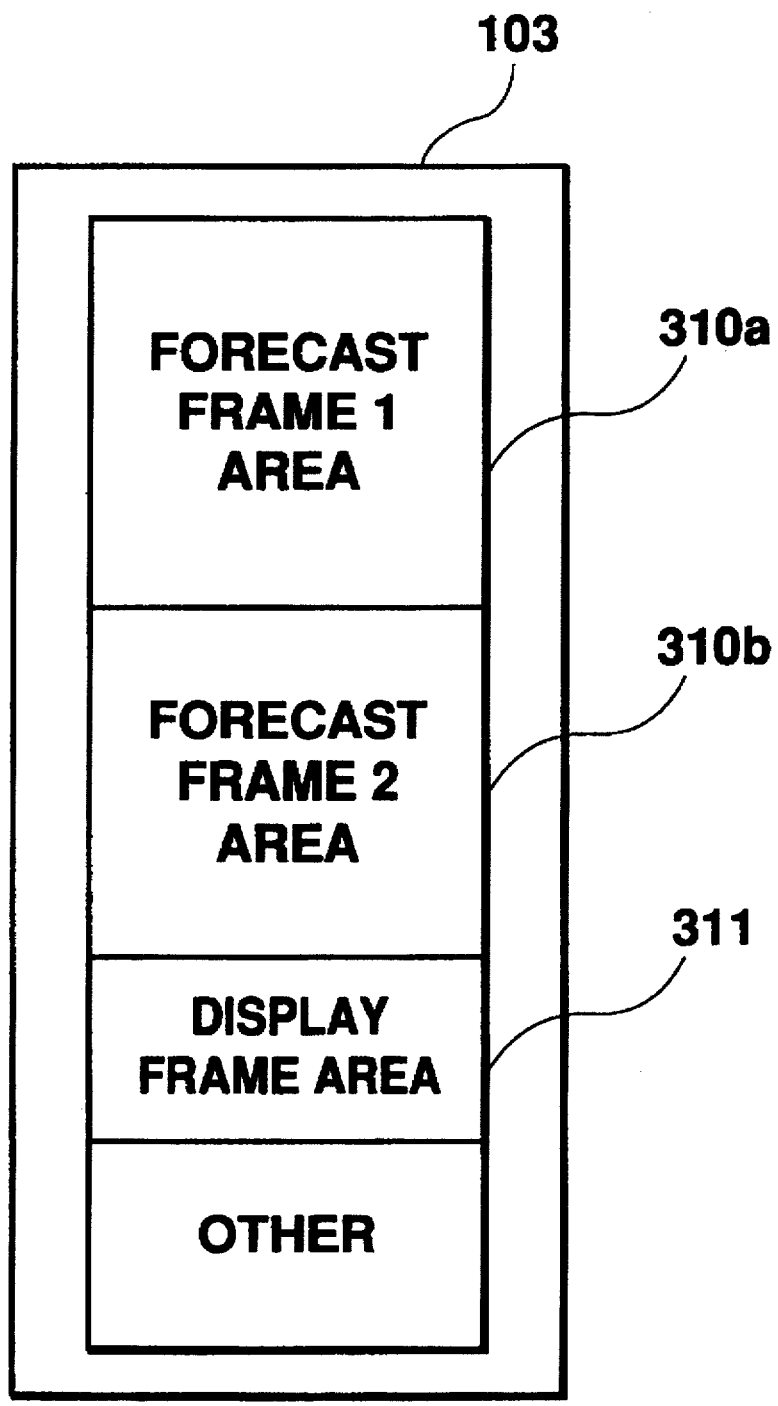
FIG. 3 is a bit map of a frame memory.

Referring now to FIG. 2, reference numeral 301 denotes a forecast frame used to decode the other image frame; and 302 a display frame only used to display the image. Referring further to FIG. 3, reference numeral 310a designates a forecast frame memory area for storing a first forecast frame; 310b a forecast frame memory area for storing a second forecast frame; and 311 a display frame memory area for storing a display frame.

The forecast frame 301 is stored in the forecast frame memory area 310 (310a and 310b) and also used to decode the other forecast frame and further utilized to decode the display frame 302. On the other hand, the display frame 302 is stored in the display frame memory area 311 of the forecast/display frame memory section 103 and only used for displaying.

In such a manner, the data of the display frame is only used for displaying. Even if any error is generated when the data is compressed by the compressing section 102 of FIG. 1 through the irreversible compression system, such an error will not be transmitted to the other frame since it does not refer to the display frame 302.

On the other hand, the data of the forecast frame written in the forecast frame memory area 310 is used to decode the other image frame. Thus, when the forecast frame 301 is compressed through the irreversible compression system, any error generated by such a compression will be transmitted to the other image frame. With use of the irreversible compression system, the compression is not performed for the forecast frame 301 while the data is accumulated in the forecast frame memory area 310. Therefore, transmission of the error generated by the compression to the other frame will be prevented.

On the other hand, when the compression is to be made in the compressing section 102 through the reversible compression system, the compressed data can be perfectly restored. Therefore, the compression is performed for both the forecast and display frames 301, 302. This reduces the amount of information.

Figure 4:
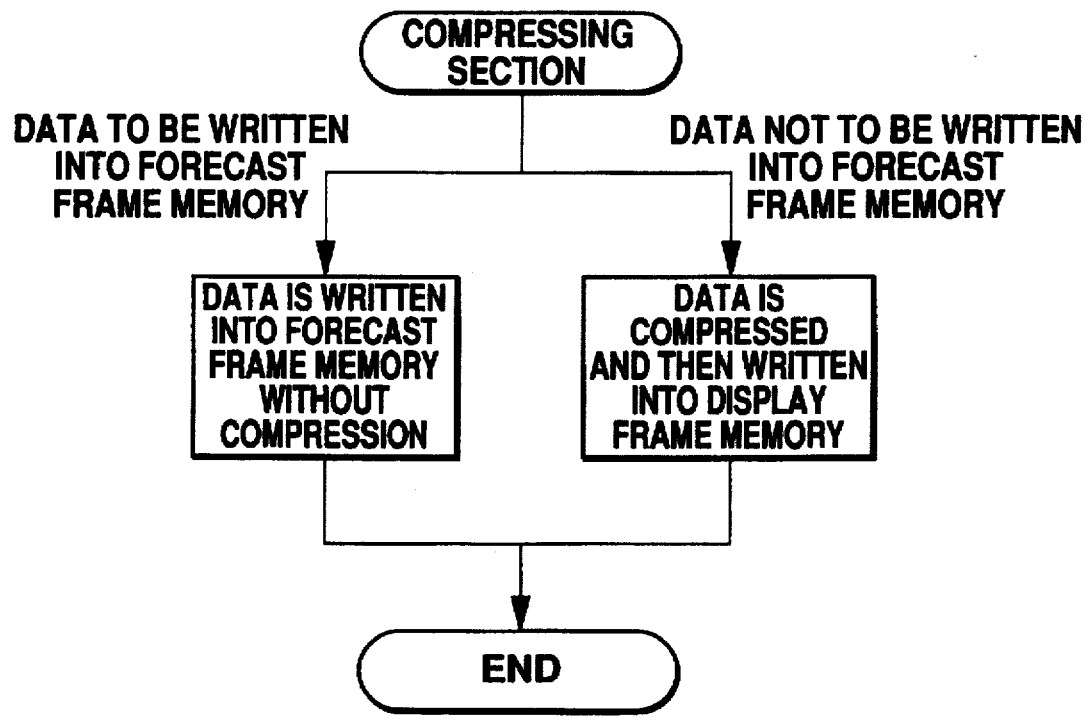
FIG. 4 is a flow chart showing a compressing process.

FIG. 4 is a flow chart showing a compression procedure. It is first judged whether the decoded image frame outputted from the decoding section 101 is a forecast or display frame data. If the data is the forecast frame data, it will be written into the forecast frame memory area 310 of the forecast/display frame memory section 103 without being compressed. On the other hand, the display frame data is written into the display frame memory area 311 of the forecast/display frame memory section 103 while being compressed. Such a procedure is preferable when the compression will not affect the other frame and if the compressing section 102 takes the irreversible compression system.

Figure 5:
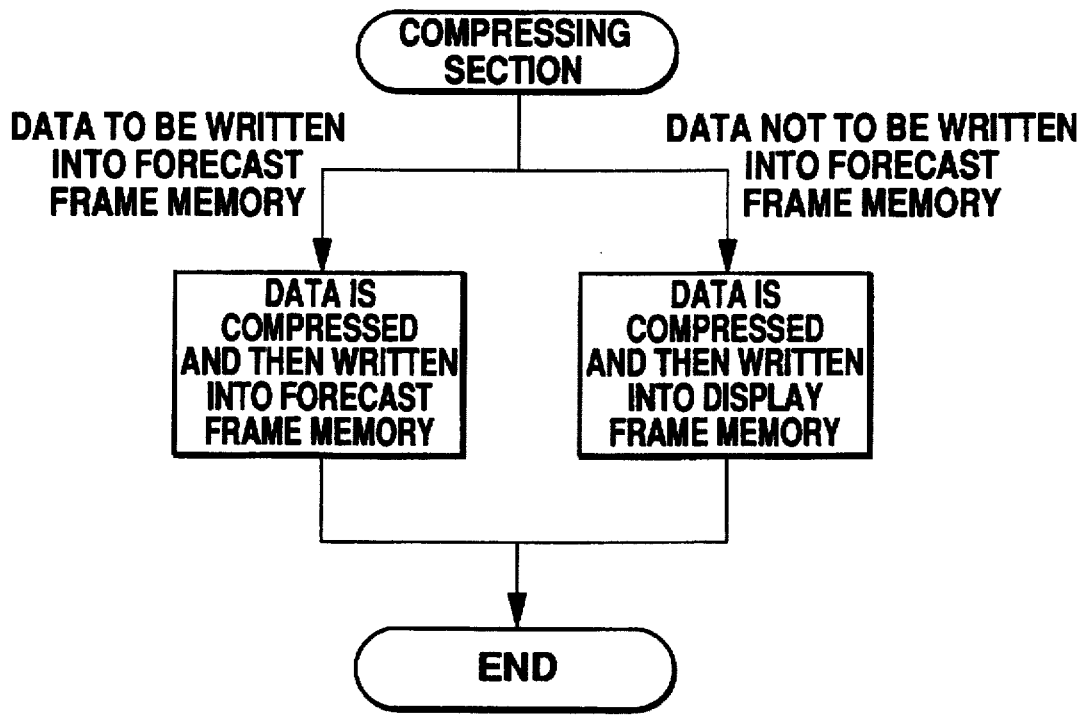
FIG. 5 is a flow chart showing another compressing process.

When the compression is performed through the reversible system as shown in FIG. 5, both the forecast and display frame data are compressed. The forecast frame data is written into both the forecast and display frame areas 310 and 311 while the display frame data is written into the display frame memory area 311.

Depending on the type of image frame there is a further case where it is preferable that only the forecast frame data be compressed.

Figure 6:
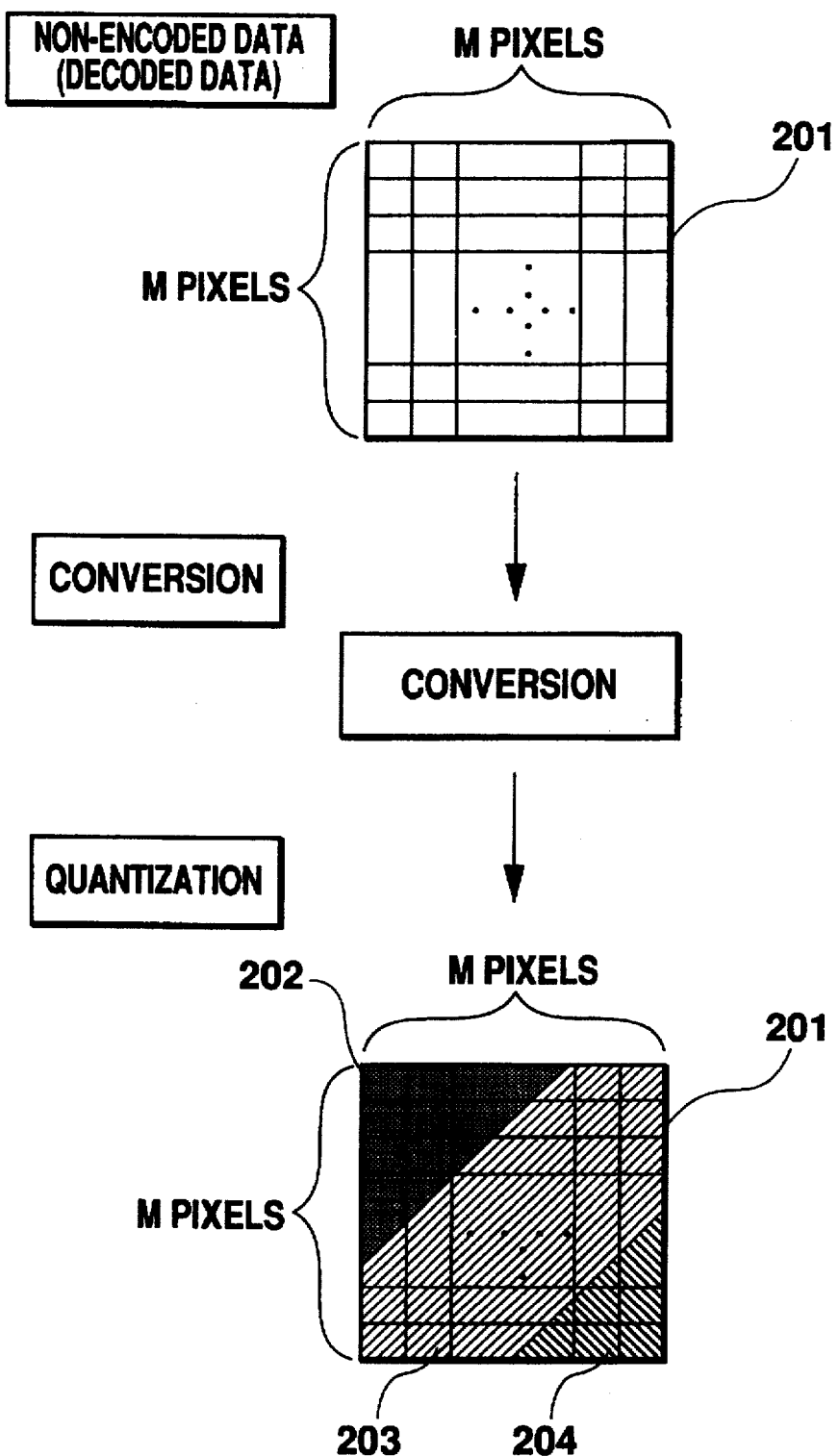
FIG. 6 is a view illustrating a quantization.

FIG. 6 schematically shows the procedure of a compression process. Data in blocks of M pixels×M lines that have been decoded at the decoding section 101 of FIG. 1 are subjected to a given conversion. Since each of the pixels is represented by bits equal in number to t, the amount of information in these blocks is equal to M×M×t. After the data of M pixels×M lines have been subjected to a conversion such as discrete cosine or other conversion, they will include low-frequency signals on the left and upper region, intermediate-frequency signals on the center region and high-frequency signals on the right and lower region.

Figure 7:
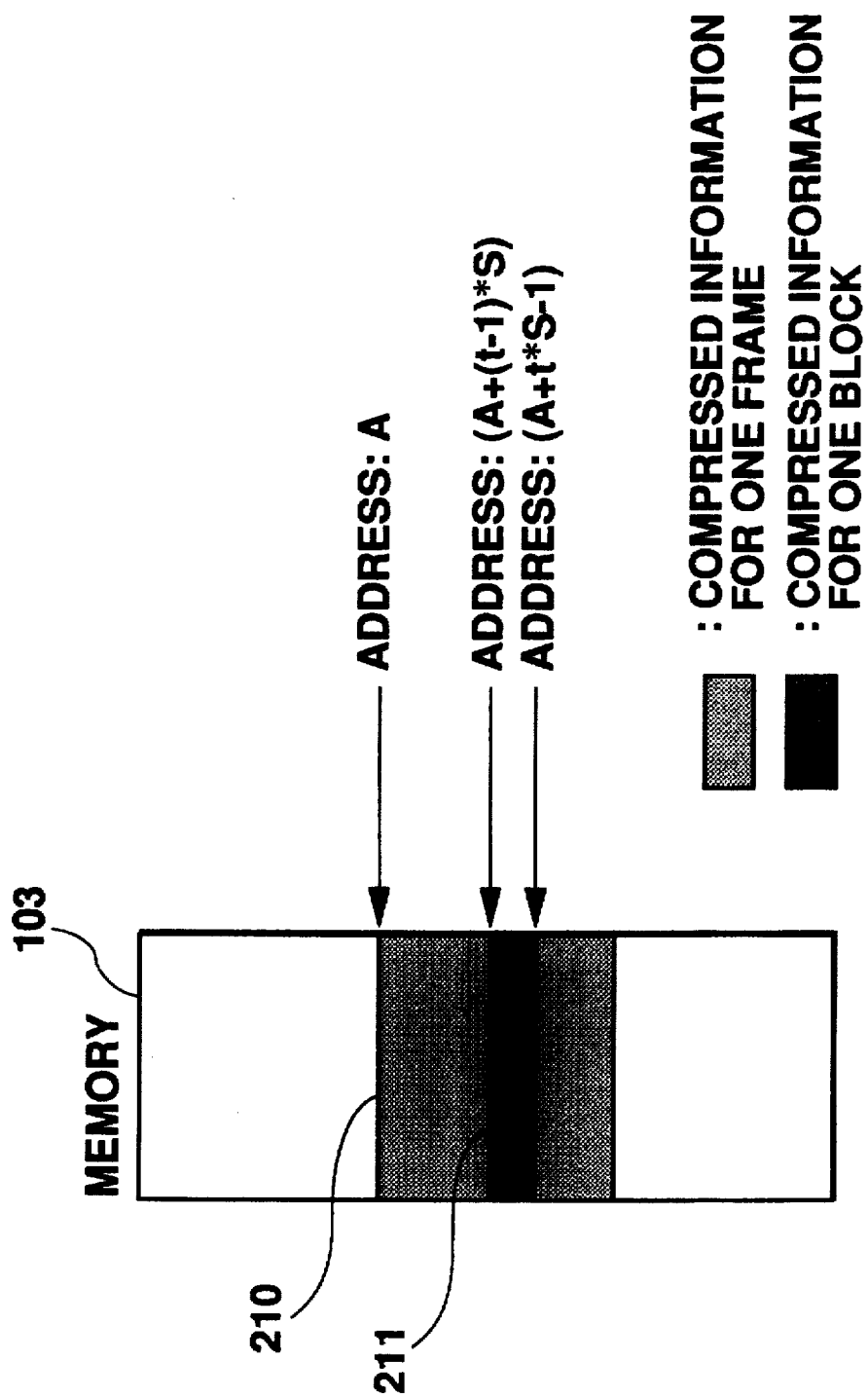
FIG. 7 is a bit map of a forecast/display frame memory section.

FIG. 7 is a memory map of data for one frame compressed at the forecast/display frame memory section 103. In this figure, reference numeral 210 denotes a location in which the information of one compressed frame is stored; and 211 a location in which the information of the t-th block in one compressed frame is stored.

The compressing section 102 converts the blocks 201 of M×M pixels depending on the characteristics of the image. The converted blocks are divided into a low-frequency signal region 202, an intermediate-frequency signal region 203 and a high-frequency signal region 204. The allocation is performed such that the number of pixels in the low-frequency signal region is equal to r1 and the allocated number of bits in the low-frequency signal region is equal to s1 bits/pixel; the number of pixels in the intermediate-frequency signal region is equal to r2 and the allocated number of bits in the intermediate-frequency signal region is equal to s2 bits/pixel; and the number of pixels in the high-frequency signal region is equal to r3 and the allocated number of bits in the low-frequency signal region is equal to s3 bits/pixel (and, however, s1>s2>s3; r1+r2+r3=M×M). The allocation of a larger number of bits to a lower-frequency region is because the signals in the lower-frequency region more greatly affect the image. Thus, the affection to the image can be reduced while the amount of data can be compressed and reduced in size.

If a quantization is performed after such an allocation of the bit number has been carried out, an amount of information S generated in the blocks:

$$S=r1 \times S1 + r2 \times S2 + r3 \times S3$$

will always be maintained constant.

Therefore, the addressing in block unit can be regularly requested and a desired image frame compressed and accumulated in a memory can be read out from any block. If it is assumed, for example, that a head address in a compressed frame is A as shown in FIG. 7, the address of the t-th block in the compressed frame is between (A+(t−1)×S) and (A+t× S−1). If the t-th block is to be accessed for decoding, any block can be easily accessed since the memory location of any compressed frame is known.

Figures 8, 9:
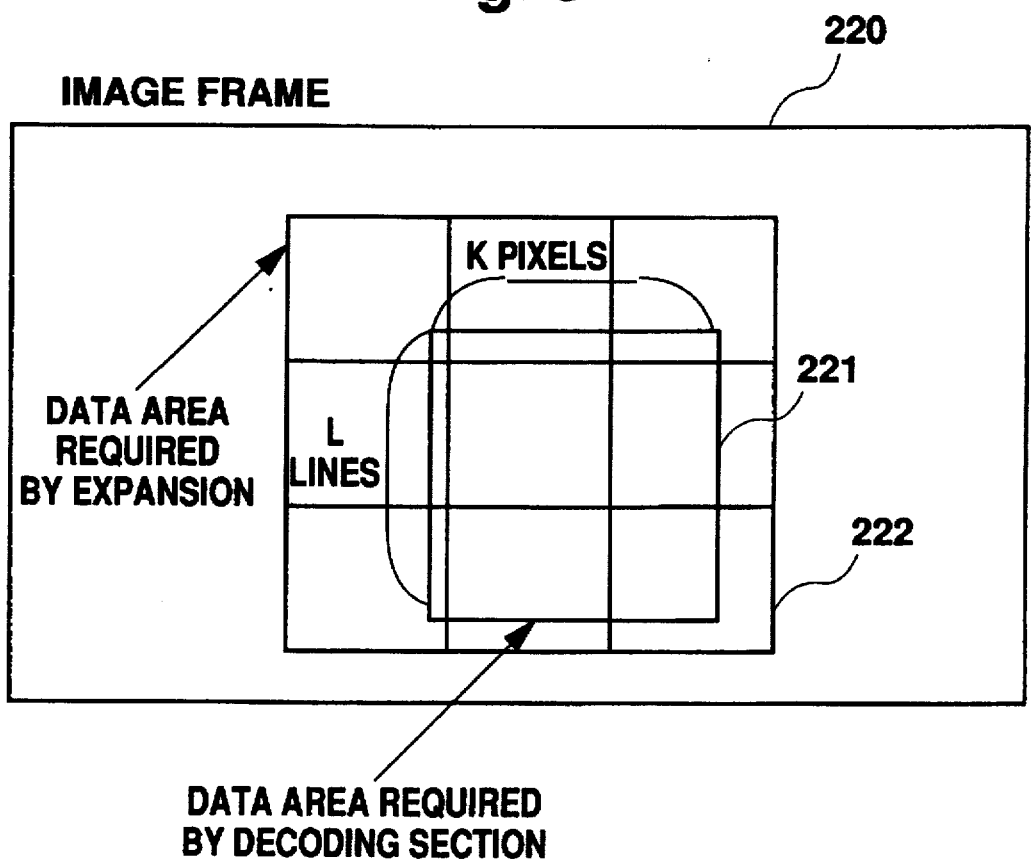
FIG. 8 is a view showing Harr conversion which is one of the compressing systems.
FIG. 9 is a view showing a data area required by the expansion and a data area to be decoded.

FIG. 8 shows a case where Harr conversion, which is one type of irreversible conversion, is used as a converting/encoding algorithm. In this figure, A shows a coefficient matrix for eight pixels×eight lines to be converted.

If it is assumed that an image of a block before it is subjected to one-dimensional Harr conversion is X and the converted block is B,

B=AX

If the block B becomes B' after it has been quantized and compressed, a block Y obtained after the block B' has been expanded is $Y=A^{-1}B$.

The compression and expansion can be carried out through such an operation.

Such a process is an irreversible compression since the number of bits is reduced through the quantization after conversion. It is to be understood that the present invention is not limited to Harr conversion, but may be similarly applied to any other conversion.

FIG. 9 shows the relationship between different areas in a one-frame image data. In this figure, reference numeral 220 denotes an image frame; 221 a decoded forecast block including P×Q pixels required by the decoding operation; and 222 a group of expanding blocks required by the expanding operation.

Referring to FIG. 9 as well as FIG. 1, the decoding section 101 uses the decoded forecast block 221 of P×Q pixels which is obtained from any point in the image frame 220 decoded as a forecasting image data and accumulated in the forecast/display frame memory section 103. On the other hand, the data within the forecast/display frame memory section 103 are compressed and stored in block units. Thus, where the encoded forecast block 221 of P×Q pixels spans between adjacent blocks, the necessary data will not be obtained by expanding only one block.

To overcome such a problem, the expanding A section 104 takes out groups of expanding blocks 222 containing the decoded forecast block 221 from the forecast/display frame memory section 103. The expansion is performed for each block. The expanding A section 104 then extracts the data of the decoded forecast block 221 required by the decoding section 101, this data being fed to the decoding section 101. Where the expanding A section 104 takes out the compressed data from the forecast/display frame memory section 103, the address of the compressed data within the forecast/display frame memory will be subjected to the aforementioned addressing.

In such a manner, the data of the decoded forecast block can be obtained from any area in the stored data. By accumulating the data of the groups of expanding blocks 222 in an expanded data block memory (not shown) within the expanding A section 104, the forecast image data required when the decoding section 101 is to decode the next block is provided only by updating a new necessary part. Particularly, the location of the decoded forecast block required by the decoding operation is forecasted on motion vectors between the frames and therefore more probably re-used between the adjacent blocks. Thus, a predetermined number of expanded blocks have been stored in the expanding A section 104. When the next block requires any other block, the stored data can be updated in block unit. This improves the efficiency of the expanding operation.

It is also preferable that a memory for storing the image data in a plurality of expanded blocks in the same arrangement as in the image frames. The data may be read out in a given sequence, for example, for each horizontal line, the necessary data portion being only extracted by a gate circuit. In such a case, such a memory is preferably of the same structure as that of a block line memory that will be described later.

Alternatively, data within the necessary range may only be read out from a memory in which image data of a plurality of blocks have been stored, the data read then being supplied to the decoding section 101. In other words, only the aforementioned data of p×q pixels may be sequentially read out and supplied to the decoding section 101.

Figure 10:
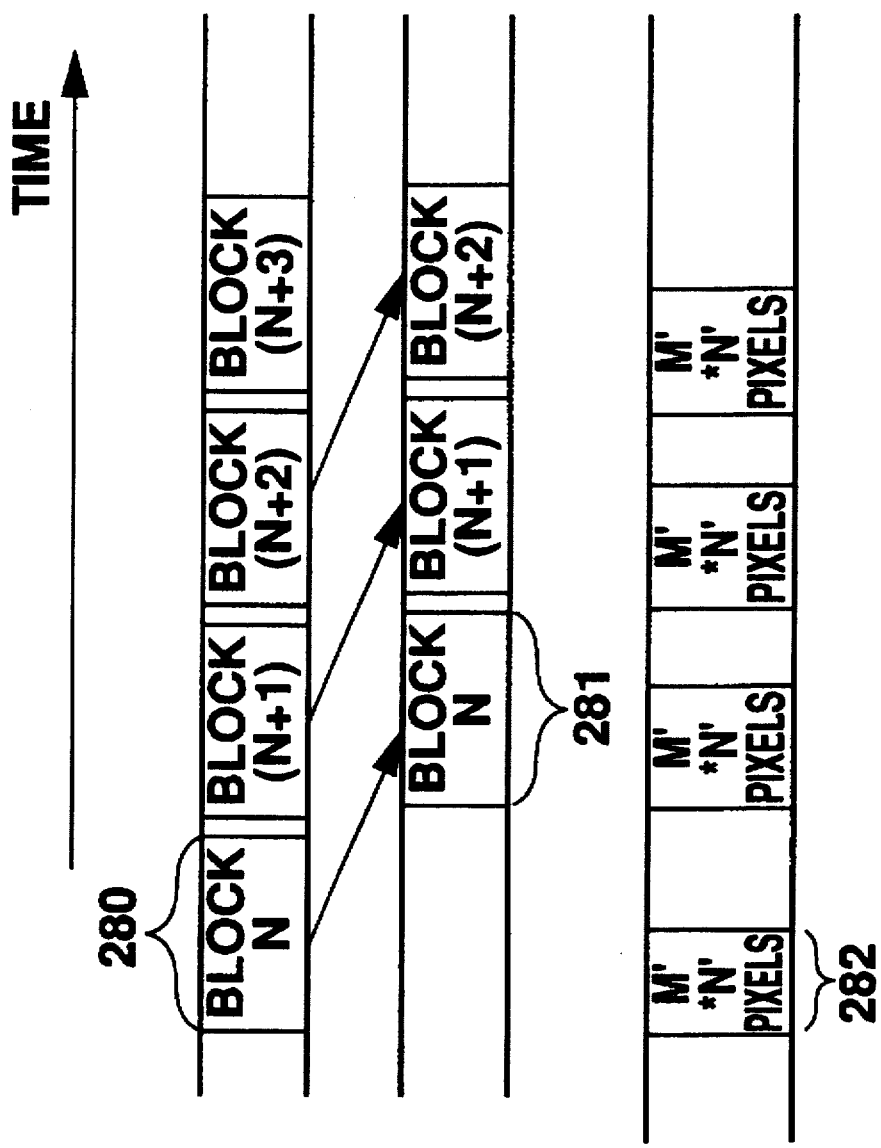
FIG. 10 is a block diagram of an expanding A section.

FIG. 10 is a timing chart in the process. In this figure, reference numeral 280 designates a block decoding time required to decode one block at the decoding section 101; 281 a compressing time required to compress one block at the compressing section 102; and 282 an expanding time required to expand the necessary data (P×Q pixels) required by the decoding section 101 at the expanding A section 104.

The decoding section 101 decodes the data encoded in block unit within the block decoding time 280. At this time, the data of P×Q pixels from the forecast/display frame memory section 103 at any start position is required as forecast data. Thus, the expanding A section 104 retrieves necessary data from the forecast/display frame memory section 103 in response to a request of the decoding section 101, the data read then being expanded and supplied to the decoding section 101. The expanding time 282 is the time required to supply the data to the decoding section 101 starting from the request of the decoding section 101 to expanding A section 104. The decoded data 151 is transferred from the decoding section 101 to the compressing section 102. The transferred data is then completely compressed within a time through which the decoded data 151 of the next block is transferred from the decoding section 101 to the compressing section 102. The compressed data is then written into the forecast/display frame memory section 103.

In such a manner, the decoding operation for encoded dynamic images can be accomplished in real time. Even if the decoded images are compressed and written into the frame memory to decrease the amount of information, the system can be operated without problem.

Figure 11:
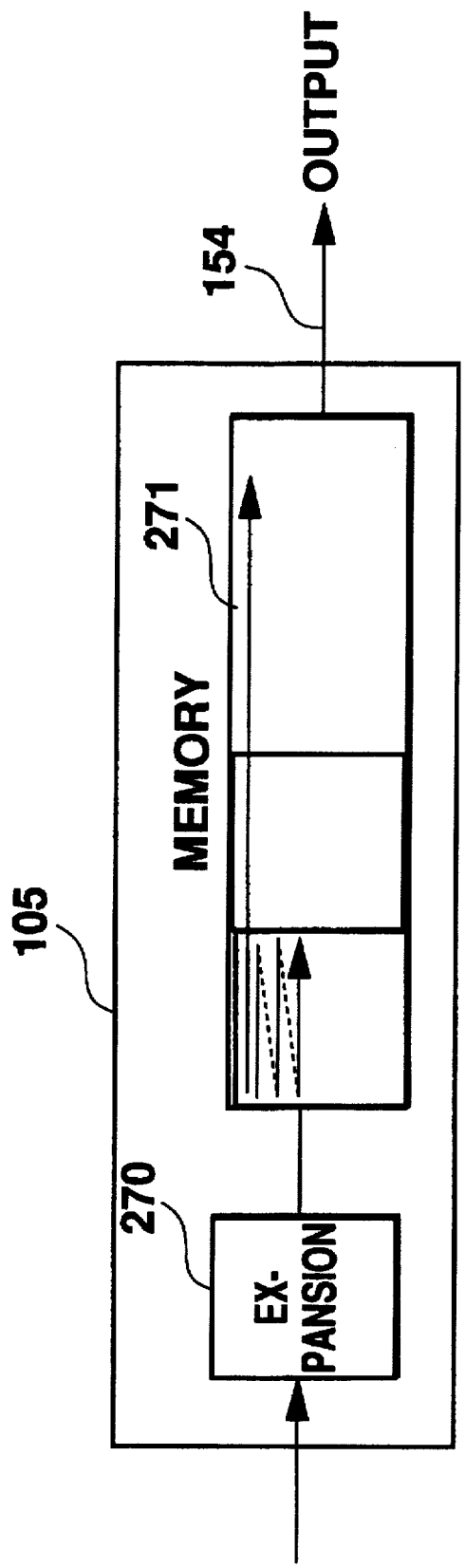
FIG. 11 is a view showing the structure of an expanding B section.

FIG. 11 shows the structure of the expanding B section 105. In this figure, reference numeral 270 represents an expanding section; and 271 a block line memory.

The expanding B section 105 receives the data of each block read out from the forecast/display frame memory section 103. The inputted block data is first expanded by the expanding section 270. The expanded data is then sequentially stored in the block line memory 271 at a given location for each block. The block line memory 271 has a capacity sufficient to accumulate all the horizontal blocks (block line) of the image frame 220. If it is assumed, for example, that the horizontal length of the image frame 220 includes pixels equal in number to T and has blocks to be compressed that are equal in number to J, the block line memory 271 will have a capacity corresponding to the blocks equal in number to J.

Figure 12:
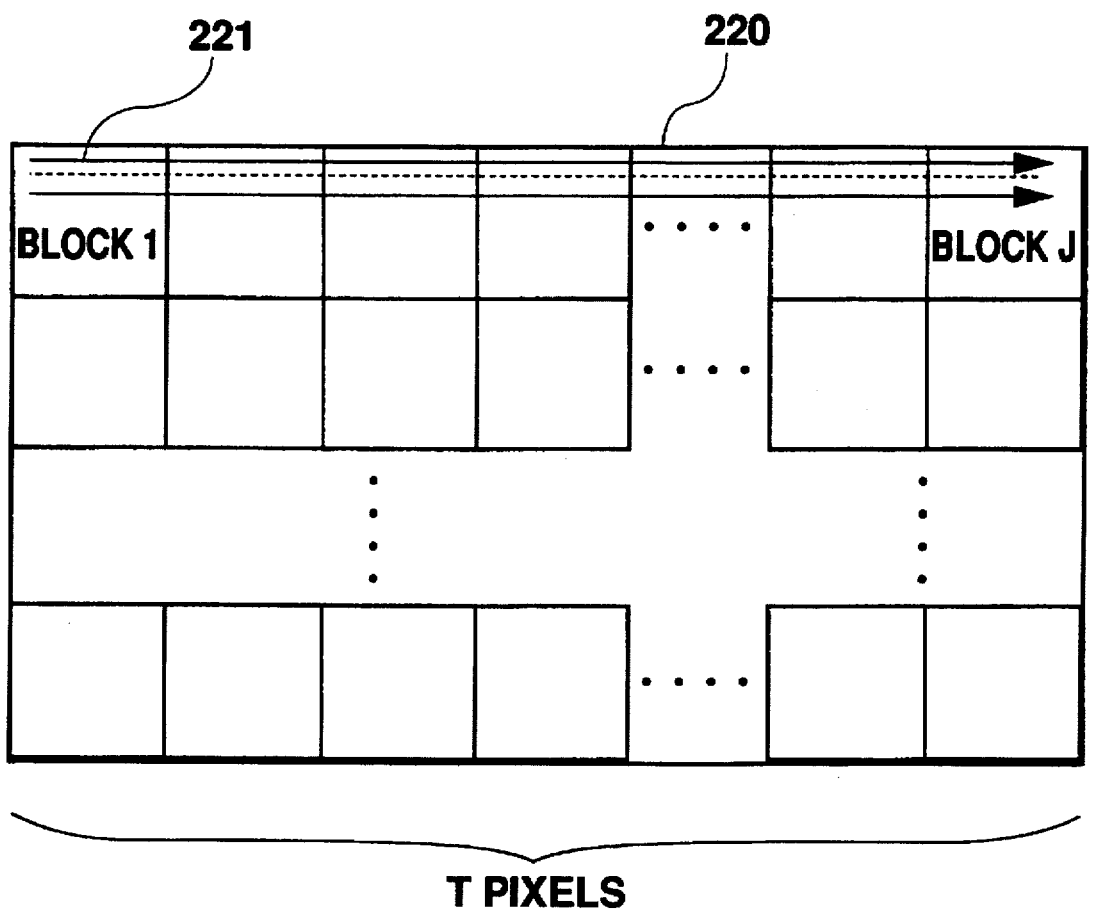
FIG. 12 is a view illustrating the process of the expanding B section.

On the other hand, the reading of blocks is carried out for each pixel along the scan lines forming the image (i.e., in the left-to-right direction spanning between the blocks), rather than in such block unit as shown in FIG. 12. In other words, the data of all the pixels on one horizontal scan line will be read out sequentially. When the reading operation is terminated for one horizontal scan line, the data of all the pixels on the next horizontal scan line will be read out. Such a procedure will be repeated.

In such an arrangement, the reading operation can be carried out in the direction of raster by accumulating the data compressed in block unit by one block line at a time. These data will be outputted for displaying an image. The displaying signal can be provided, for example, by reading out the data on one horizontal scan line in synchronism with a horizontal synchronizing signal that defines one horizontal scan line for a displayed scene.

Figure 13:
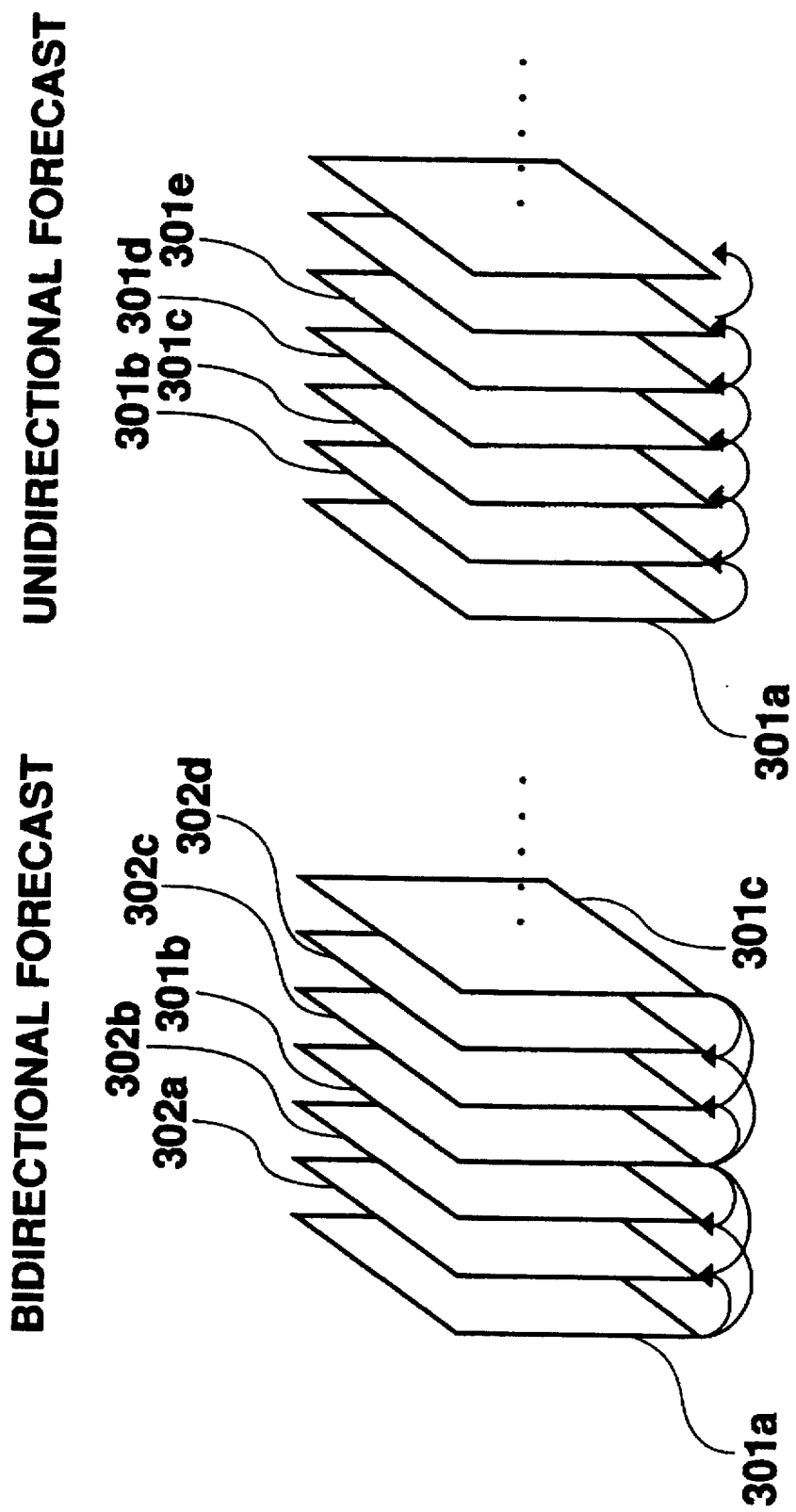
FIG. 13 is a view showing different types of encoded trains.
Figure 14:
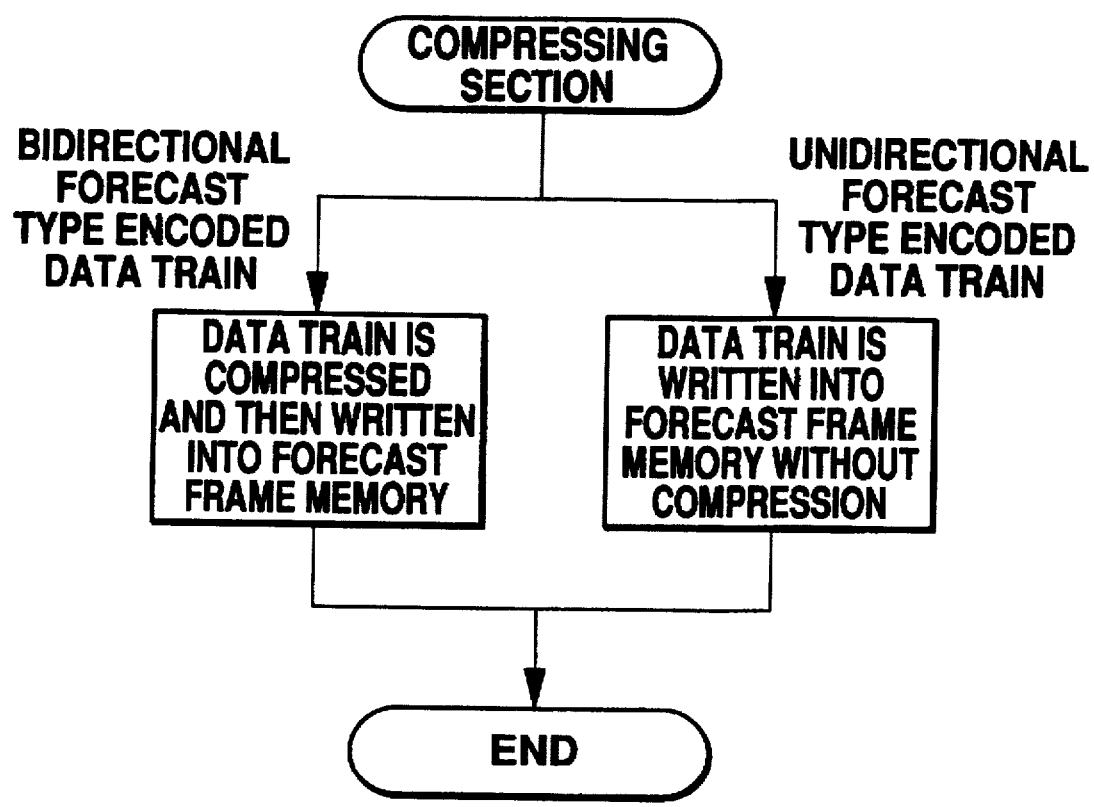
FIG. 14 is a flow chart illustrating the compressing operation.

FIG. 13 shows different types of encoded trains; FIG. 14 is a flow chart illustrating the operation of the compressing section; and FIG. 15 is a schematic bit map of a forecast frame memory that holds the compressed data.

As shown in FIG. 13, the encoded data trains are of a bidirectional forecast type and a unidirectional forecast type. More particularly, the bidirectional forecast type encoded data train is adapted to decode an image by using the data in both the forward and backward frames as forecast data. The unidirectional forecast type encoded data train is adapted to decode an image by the use of the data in only the forward frame as forecast data.

As shown in FIG. 14, the type of encoded data train is judged. If it is a unidirectional forecast type encoded data train, the decoded data are sequentially written into the forecast frame memory areas 310a and 310b without being compressed by the compressing section 102. On the other hand, if the encoded data train is of the bidirectional forecast type, the data are compressed into two compressed frame data which are in turn written into the forecast frame memory areas 310a and 310b, respectively.

Figure 15:
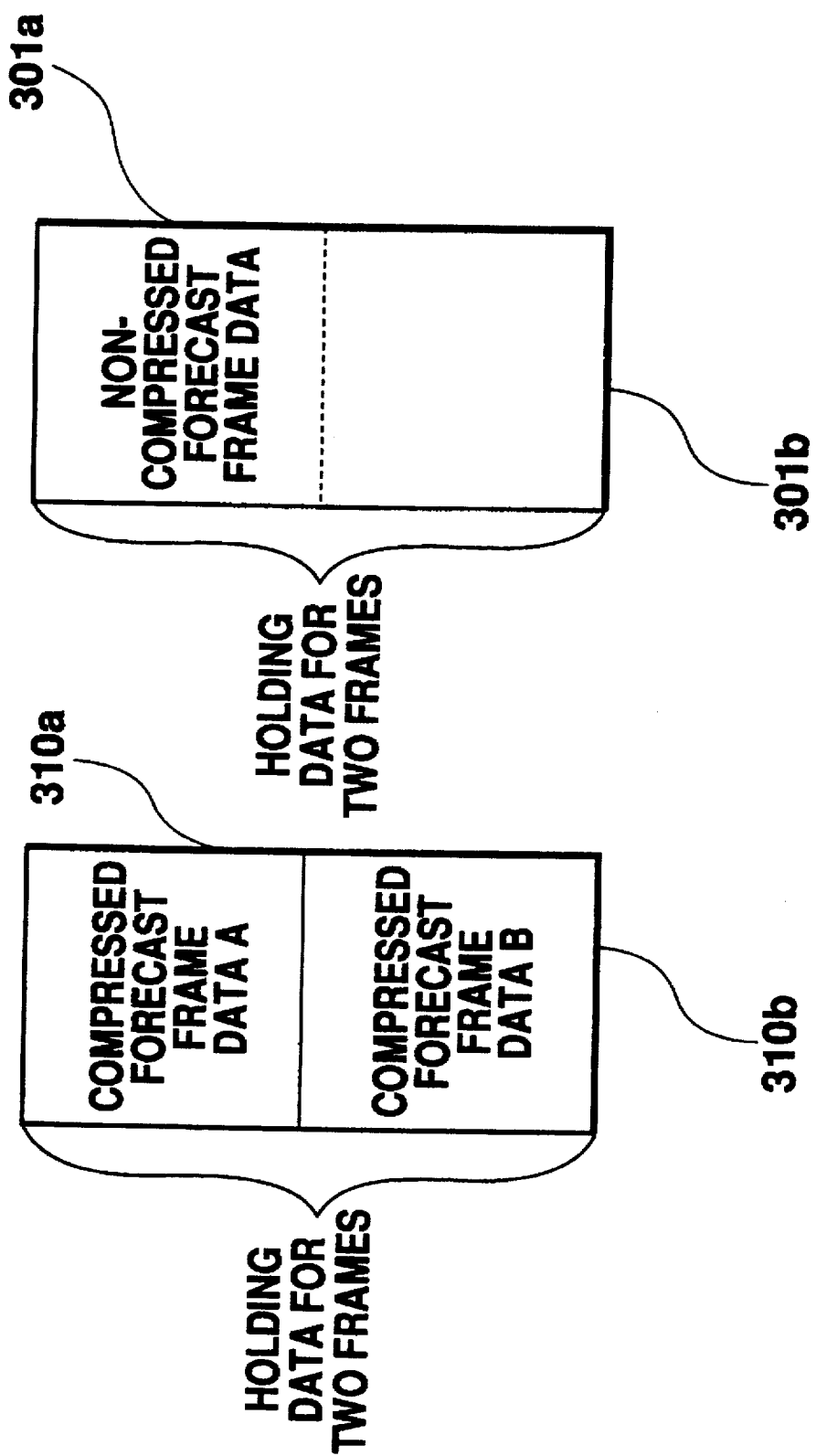
FIG. 15 is a schematic bit map of a forecast frame memory.
Figure 16:
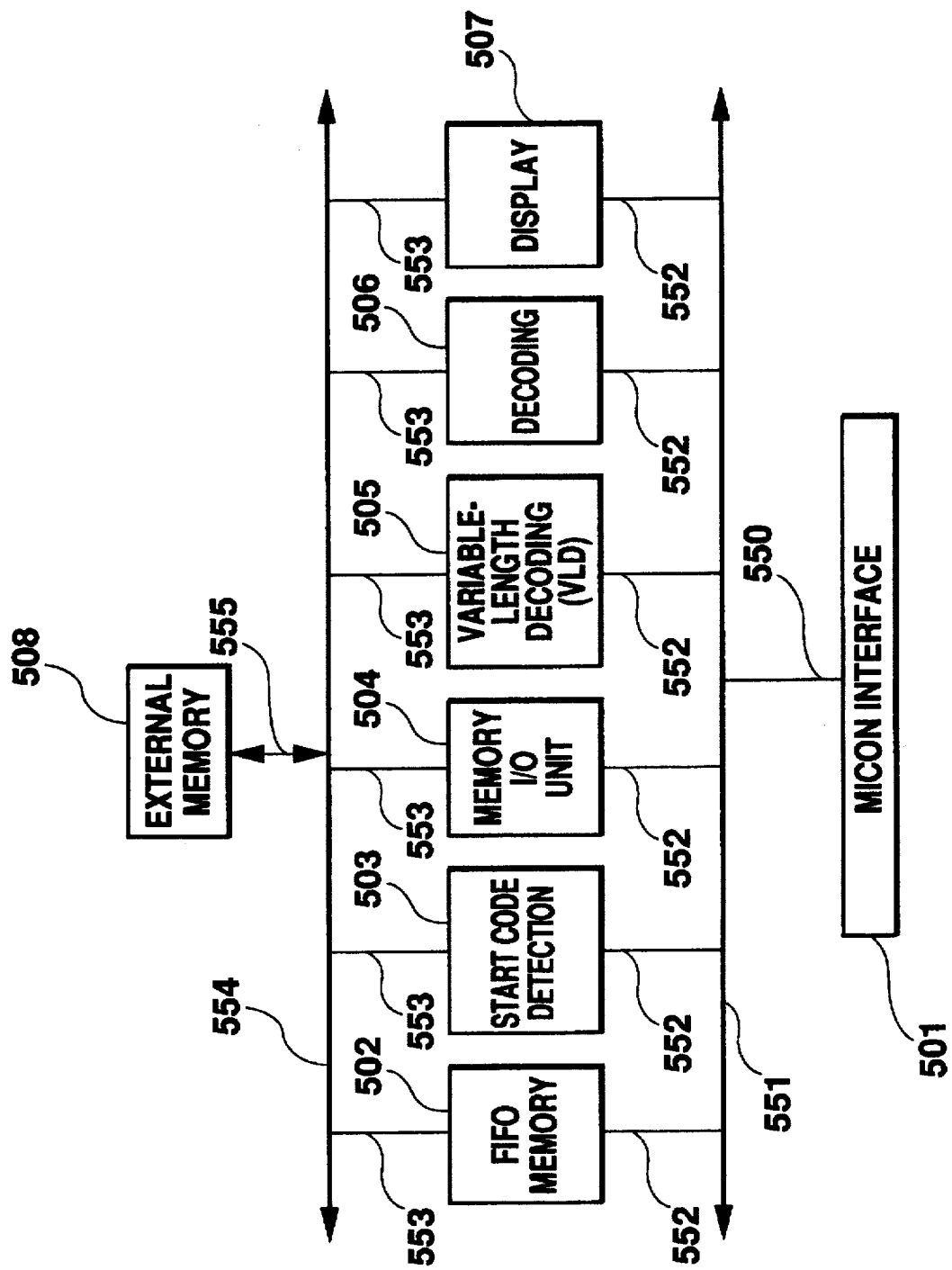
FIG. 16 is a block diagram of a digital image decoding apparatus constructed in accordance with the prior art.
Figure 17:
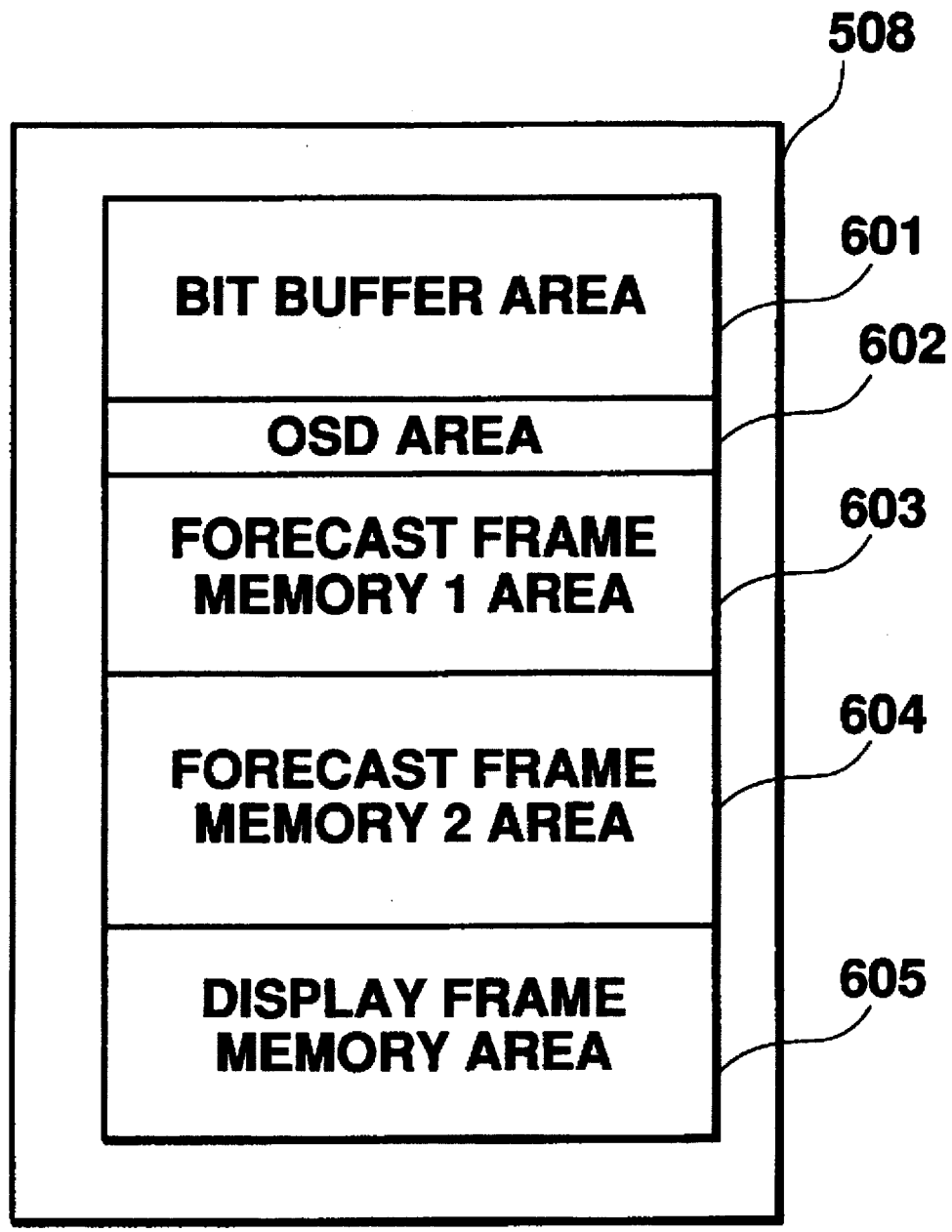
FIG. 17 is a bit map of the prior art frame memory.

In such a manner, the data will be stored as shown in FIG. 15. More particularly, the compressed data of the two frames used for forecast are respectively stored in the forecast frame areas 310a and 310b of the forecast/display frame memory section 103 if the encoded data train is of the bidirectional forecast type. This is used to perform the decoding operation at the decoding section 101. If the encoded data train is of the unidirectional forecast type, the decoding operation is made using the data of one frame which is stored in the forecast frame memory area 310.

Since the decoding operation can be carried out without need of the compression if the encoded data train is of the unidirectional forecast type, the image will not be degraded due to the compression. If the encoded data train is of the bidirectional forecast type, two forecast frames can be used to forecast and encode the other frames between these two frames. This enables the encoding operation to be made more efficiently. When the data compressed by the compressing section 102 are stored in the forecast/display frame memory section 103, a smaller capacity for that memory can be maintained.

We claim:

1. A digital image decoding apparatus comprising:

a decoding section for decoding inter-block image decoded data in block units to form decoded data;

a compressing section for compressing the decoded-in-block-unit data from said decoding section in block unit to form compressed data;

a forecast frame memory section for holding the compressed-in-block-unit data from said compressing section which correspond to one or more image frames; and an expanding section for supplying data required by the decoding operation at said decoding section to said decoding section, said expanding section being operative to read out the compressed data from said forecast frame memory section, the read compressed data being then expanded and supplied to said decoding section.

2. A digital image decoding apparatus as defined in claim 1 wherein said decoding section is operative to decode encoded dynamic image data sequentially in block units and wherein said compressing section is operative to completely compress the encoded-in-block-unit data from said decoding section within a time shorter than the decoding time.

3. A digital image decoding apparatus as defined in claim 1, further comprising a frame memory section for holding one or more image display frames used only to display the data supplied from said compressing section.

4. A digital image decoding apparatus as defined in claim 3 wherein said compressing section is operative to compress at least the data of a forecast frame to be written in said forecast frame memory or the data of a display frame to be written into said display frame memory.

5. A digital image decoding apparatus as defined in claim 3 wherein said compressing section is operative to compress both the data of a forecast frame to be written in said forecast frame memory and the data of a display frame to be written into said display frame memory.

6. A digital image decoding apparatus as defined in claim 3 wherein the data input into said decoding section are inter-frame encoded data and wherein said compressing section is operative not to compress the inter-frame encoded data if they are of the unidirectional forecast type from the forward direction and operative to compress the inter-frame encoded data if they are of the bidirectional forecast type from the forward and backward directions.

7. A digital image decoding apparatus as defined in claim 1 wherein said decoding section is operative to output an encoded data having pixels each of a bit length equal to t (which is a natural number), said pixels being included in blocks each of which is formed by M (=2m) pixels×N (=2n) lines (in which m and n are natural numbers) and wherein said compressing section is operative to allocate more bit length to important converted coefficients and to allocate less bit length to less important coefficients.

8. A digital image decoding apparatus as defined in claim 7 wherein said compressing section is operative to encode the number of bits generated after one block has been converted into a fixed length equal to S bits (S<M×N×t).

9. A digital image decoding apparatus as defined in claim 1, further comprising a forecast frame expanding section for reading out the compressed data for one or more blocks which include the data of the block of P pixels×Q lines at a given location from said forecast frame memory when the block data determined by P (=2p) pixels×Q (=2q) lines (in which p and q are natural numbers) in the forecast frame stored in the forecast frame memory of said decoding section at said given location are required, the read compressed data then being expanded with the necessary block data of P pixels ×Q lines being extracted therefrom and supplied to said decoding section.

10. A digital image decoding apparatus as defined in claim 9 wherein said forecast frame expanding section includes a block memory for expanding and storing the compressed in-block-unit data read out from the forecast frame memory by a plurality of blocks and wherein, if new block data is required by the decoding operation, said block memory is updated for each block.

11. A digital image decoding apparatus as defined in claim 9 wherein the processing speed in said forecast frame expanding section is sufficiently higher than that of said decoding section, thereby eliminating a time loss in the decoding operation for encoded dynamic image data.

12. A digital image decoding apparatus as defined in claim 3, further comprising a display expanding section for reading out the compressed data stored in said display frame memory in block unit, expanding the read out data and sequentially outputting the expanded data in the horizontal image frame scan direction.

13. A digital image decoding apparatus as defined in claim 12 wherein said display expanding section has a display memory for storing the expanded data for each block in the horizontal image frame width direction, whereby the data can be read out from said display memory depending on the image display scan line.

* * * * *